United States Patent [19]

Sturman

[11] Patent Number: 5,700,136
[45] Date of Patent: Dec. 23, 1997

[54] DIGITAL PUMP WITH BYPASS INLET VALVE

[75] Inventor: Oded E. Sturman, Woodland Park, Colo.

[73] Assignee: Sturman Industries, Woodland Park, Colo.

[21] Appl. No.: 685,146

[22] Filed: Jul. 23, 1996

[51] Int. Cl.$^6$ .................................................. F04B 1/26
[52] U.S. Cl. .......................... 417/270; 417/296; 417/298; 123/506; 137/522; 137/487.5
[58] Field of Search .................................. 417/269, 270, 417/273, 296, 297, 298; 123/506; 137/522, 487.5

[56] References Cited

U.S. PATENT DOCUMENTS

| | | | |
|---|---|---|---|
| 3,225,785 | 12/1965 | Goike | 137/487.5 |
| 4,389,167 | 6/1983 | Farr | 417/298 |
| 5,456,581 | 10/1995 | Jokela et al. | 417/270 |
| 5,577,892 | 11/1996 | Schittler et al. | 123/506 |

*Primary Examiner*—Charles G. Freay
*Attorney, Agent, or Firm*—Blakely Sokoloff Taylor & Zafman

[57] ABSTRACT

A pump which has a digitally controlled internal by-pass valve. The pump includes a housing which has a pumping chamber that contains a piston which pumps fluid from an inlet port to an outlet port of the housing. The pump also has an intake valve that moves to an open position when the pump draws in fluid and moves to a closed position when the piston pumps the fluid through the outlet port. The intake valve can be maintained in the open position by a separate hydraulic system so that the piston pumps fluid back through the inlet port and by-passes the outlet port. The separate hydraulic system includes a three-way solenoid control valve which directs fluid to the intake valve to open the valve. The control valve may contain a pair of solenoids which latch an internal spool to control the flow of fluid to the intake valve. The spool can be latched into position by a digital pulse that is provided by an electrical controller. The controller can control the output pressure of the pump by opening the intake valve and by-passing the outlet port.

18 Claims, 2 Drawing Sheets

DIGITAL PUMP WITH BYPASS INLET VALVE

BACKGROUND OF THE INVENTION

1. Field of the Invention

The present invention relates to a pump that contains a digitally controlled internal by-pass valve.

2. Description of Related Art

Compression ignition internal combustion engines contain fuel injectors that inject diesel fuel into the combustion chambers of the engine. To insure adequate injection pressures the fuel must be provided to the injectors at a desired rail pressure. The rail pressure is created by a pump that is driven by the engine. To compensate for variations in engine temperature, rpm's, and other factors the fuel system typically contains a pressure relief valve which opens when the rail pressure exceeds a predetermined value. The pressure relief valve typically contains a spring which biases the valve into a closed position. The pump generates work to overcome the force of the spring even during a by-pass cycle of the system. The additional work increases the frictional horsepower and reduces the fuel efficiency of the engine. It would therefore be desirable to provide a fuel pump that can by-pass the fuel system without requiring work from the pump.

It may be desirable to vary the rail pressure of the fuel system under different operating conditions. Engine pumps are typically positive displacement devices that are mechanically driven by the crankshaft of the engine. The output of the pump is therefore fixed to the speed of the engine. It would be desirable to provide a pump that can vary the output pressure independent from the speed of the engine.

SUMMARY OF THE INVENTION

The present invention is a pump which has a digitally controlled internal by-pass valve. The pump includes a housing which has a pumping chamber that is coupled to an inlet port and an outlet port. Located within the pumping chamber is a piston which pumps fluid from the inlet port to the outlet port. The pump also has an intake valve that moves to an open position when the pump draws in fluid and moves to a closed position when the piston pumps the fluid through the outlet port. The intake valve can be maintained in the open position by a separate hydraulic system so that the piston pumps fluid back through the inlet port and by-passes the outlet port. The separate hydraulic system includes a three-way solenoid control valve which directs fluid to the intake valve to open the valve. The control valve may contain a pair of solenoids which latch an internal spool to control the flow of fluid to the intake valve. The spool can be latched into position by a digital pulse that is provided by an electrical controller. The controller can control the output pressure of the pump by opening the intake valve and by-passing the outlet port.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
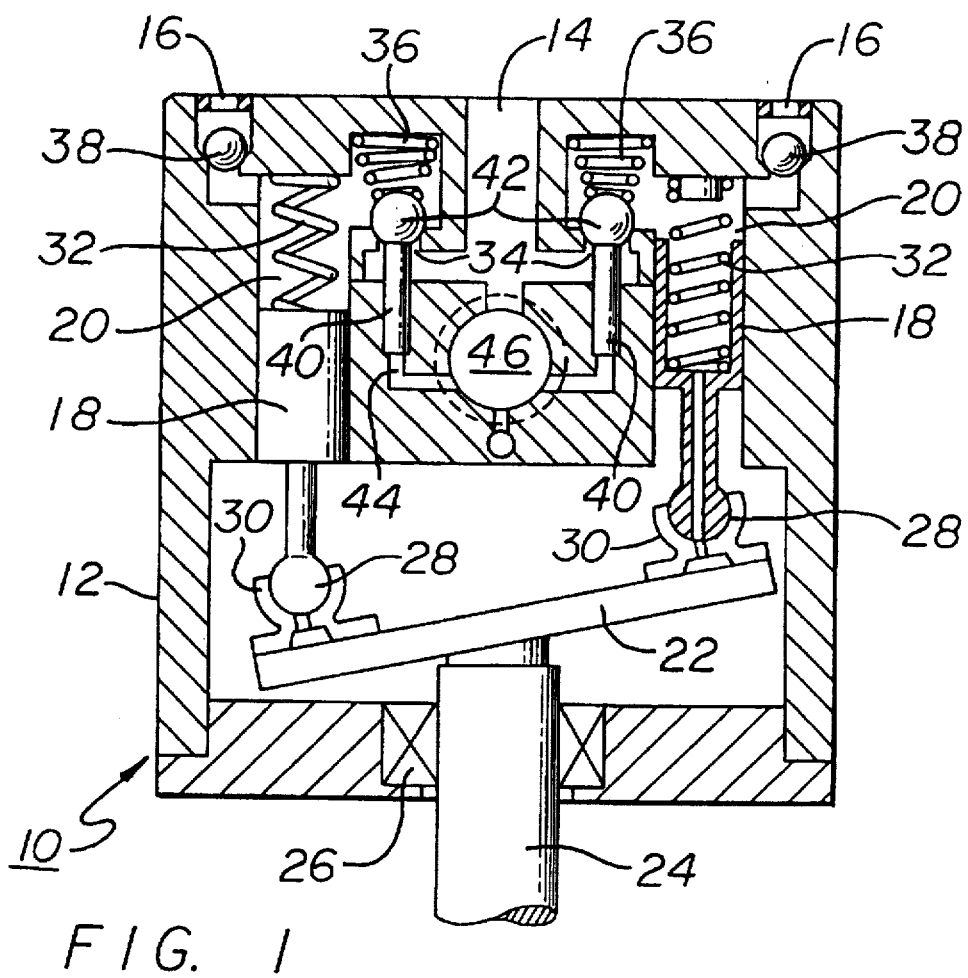
FIG. 1 is a cross-sectional view of a pump of the present invention.

Referring to the drawings more particularly by reference numbers, FIG. 1 shows a pump 10 of the present invention. The pump 10 includes a housing 12 which has an inlet port 14 and a pair of outlet ports 16. The outlet ports 16 are typically coupled to an external device(s) such as the fuel injectors (not shown) of an engine. The inlet port 14 is typically coupled to a source of fluid such as a fuel tank (not shown) of an automobile.

The housing 12 also has a pair of pistons 18 located within corresponding pumping chambers 20. The pistons 18 move in a reciprocating motion to pump fluid from the inlet port 14 to the outlet ports 16. The pistons 18 are driven by a wobble plate 22 that is rotated by a shaft 24 which is coupled to the housing 12 by a bearing assembly 26. The shaft 24 is typically rotated by an external device such as the crankshaft of an engine. Rotation of the shaft 24 spins the wobble plate 22 and reciprocates the pistons 18. The pistons 18 typically move 180° out of phase from each other so that one piston is pumping fluid through the outlet port 16 while the other piston 18 is drawing fluid in through the inlet port 14. The pistons 18 are preferably coupled to the wobble plate 22 by a ball 28 that cooperates with a socket 30. Each pumping chamber 20 contains a return spring 32 which biases the pistons 18 in a downward direction.

The flow of fluid through the inlet port 14 is controlled by a pair of intake valves 34. The intake valves 34 are biased into a closed position by springs 36. The flow of fluid through the outlet ports 16 is controlled by a pair of one-way ball valves 38. Movement of a piston 18 in a downward direction creates a differential pressure that opens the intake valve 34 and allows fluid to flow from the inlet port 14 to the pumping chamber 20. When the wobble plate 22 drives the piston 18 in an upward direction the fluid is pressurized and pushed through the one-way valve 38 out of outlet port 16 while the intake valves 34 are in a closed position.

The intake valves 34 preferably have a rod 40. The rods 40 are each coupled to a ball 42 that is biased by the springs 36. The rods 40 are located within a channel 44 that is coupled to a control valve 46. The control valve 46 can be actuated to pressurize a fluid within the channels 44. The pressurized fluid pushes the rods 40 and moves the intake valves 34 to the open position. The intake valves 34 can be maintained in the open position so that the pistons 18 pump the fluid back through the inlet port 14 and bypass the outlet ports 16. In the by-pass mode the pump 10 can continue to operate while expending minimal work.

Figure 2:
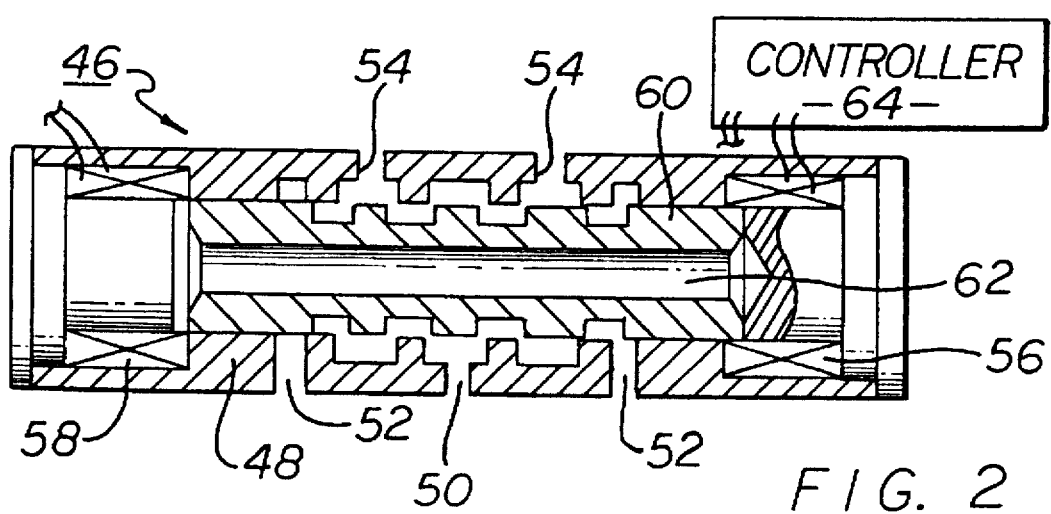
FIG. 2 is a cross-sectional view of a solenoid control valve of the pump.

FIG. 2 shows a preferred embodiment of the control valve 46. The control valve 46 is preferably a digitally latched three-way solenoid actuated spool valve. The valve 46 includes a housing 48 which has a return port 50, a pair of supply ports 52 and a pair of cylinder ports 54. The cylinder ports 54 are coupled to the channel 44 of the pump housing 12. The return port 50 is preferably coupled to the inlet port 14 of the pump. The supply ports 52 are preferably coupled to the outlet ports 16 of the pump. The ports 52 and 54 are preferably symmetrically located about the supply port 50 to dynamically balance the control valve 46.

The valve 46 contains a first solenoid 56 and a second solenoid 58 that move a spool 60 between a first position and a second position. When the first solenoid 56 is energized the spool 60 is moved to the first position to provide fluid communication between the cylinder ports 54 and the return port 50. The spool 60 is moved to the second position to couple the cylinder ports 54 to the supply ports 52 when the second solenoid 58 is energized. The spool 60 may have an inner channel 62 to statically balance the control valve 46.

The control valve 46 is connected to a controller 64 which provides digital pulses to the solenoids 56 and 58. The housing 48 and spool 60 are preferably constructed from a magnetic steel such as 440C or 52100 that will maintain the position of the spool 60 even when power is terminated to the solenoids. The spool 60 can be moved by providing a short digital pulse to a solenoid, wherein the magnetization of the material maintains the position of the spool 60.

The controller 64 can control the output pressure of the pump 10 by latching the valve 46. For example, the controller 64 can reduce the output pressure of the pump by latching the spool 60 into the second position so that the intake valves 34 are moved and maintained in the open position even during the pumping stroke of the pump. The output pressure of the pump can be subsequently increased by latching the spool 60 into the first position and releasing the intake valves 34.

Figure 3:
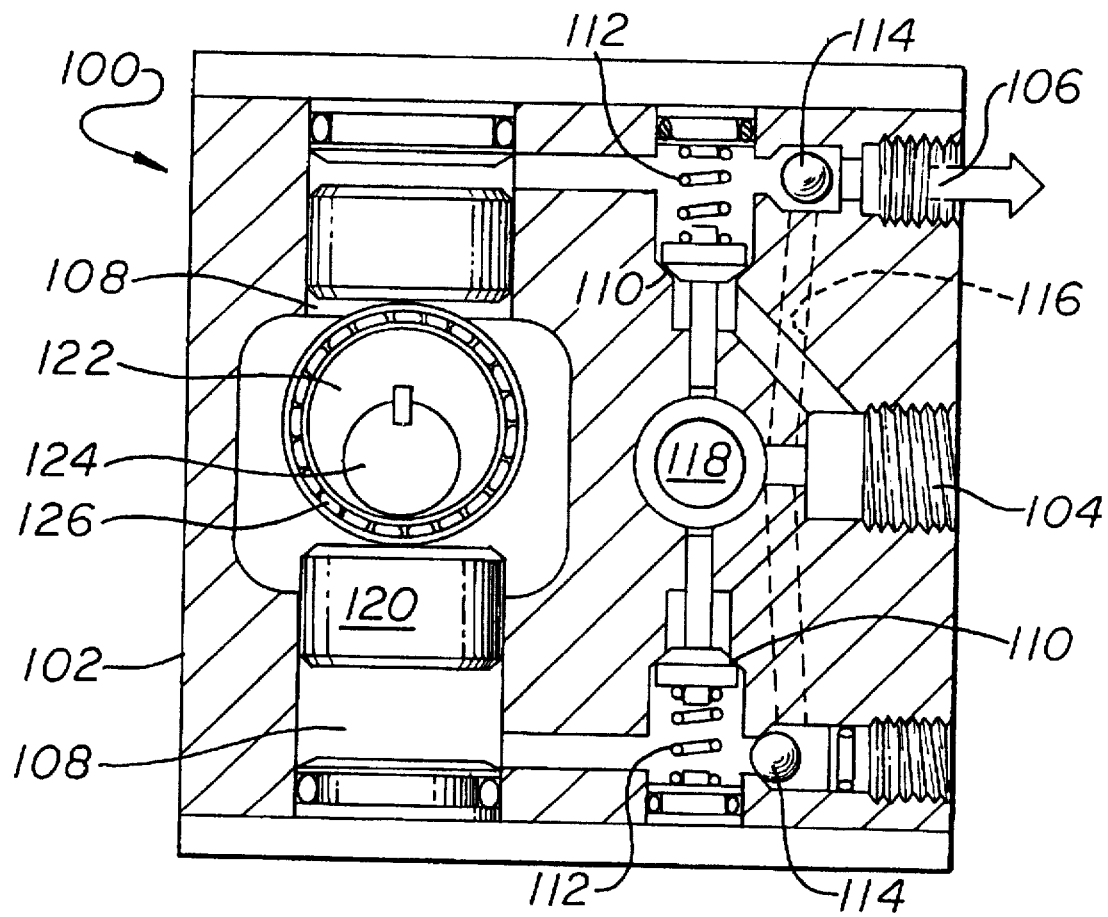
FIG. 3 is a cross-sectional view of an alternate embodiment of the pump.

FIG. 3 shows an alternate embodiment of a pump 100. The pump 100 includes a housing 102 which has an inlet port 104 and an outlet port 106. The inlet port 104 is coupled to a pair of pumping chambers 108 by a pair of intake valves 110 that are biased into a closed position by a pair of springs 112. The flow of fluid through the outlet port 106 is controlled by a pair of one-way ball valves 114. The housing 102 may contain an inner channel 116 that couples one of the pumping chambers 108 to the outlet port 106. The intake valves 110 may be moved and maintained in an open position by directing fluid through a control valve 118. The control valve 118 is preferably the digitally latched three-way solenoid valve shown in FIG. 2.

The pump 100 may have a piston 120 that is reciprocated by an eccentric cam 122 that is driven by an output shaft 124. The piston 120 may be coupled to the eccentric cam 122 by a bearing assembly 126. Rotation of the eccentric cam 122 moves the piston 120 to pump fluid from the inlet port 104 to the output port 106. The control valve 118 can be latched to open the intake valves 110 and vary the output pressure of the pump 110.

Figure 4:
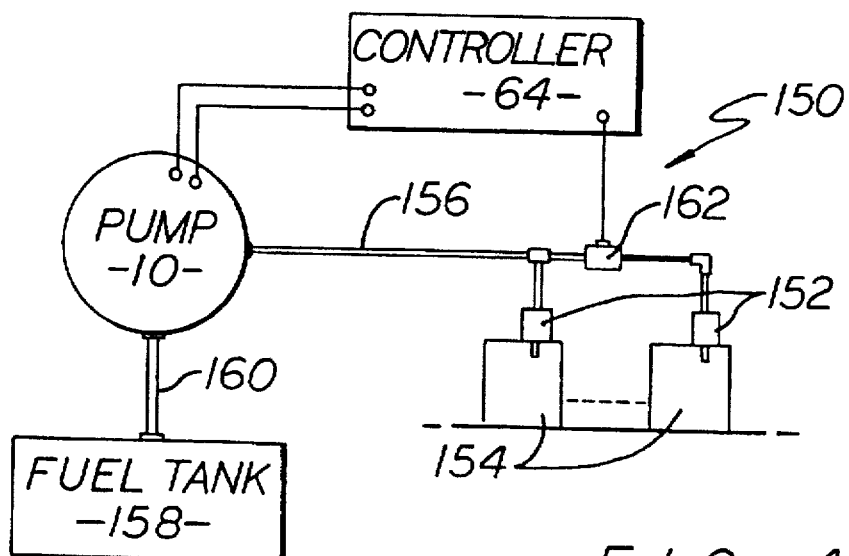
FIG. 4 is a schematic of the pump within a fuel system of an internal combustion engine.

As shown in FIG. 4, the pump 10 or 100 can be incorporated into a fuel system 150 of an internal combustion engine. The engine may contain a plurality of fuel injectors 152 that inject fuel into combustion chambers 154. The fuel injectors 152 are connected to the outlet ports of the pump 10 by fuel lines 156. The fuel system 150 typically includes a fuel tank 158 that is connected to the inlet port of the pump 10 by fuel line 160. The fuel system 150 may also have pressure sensors 162 that are coupled to the controller 64 of the pump 10. The controller 64 can vary or maintain the rail pressure of the fuel system 150 by opening the internal intake valves and placing the pump in a bypass mode. Thus when the rail pressure exceeds a desired value the controller 64 may open the intake valves and by-pass the pump.

Additionally, by connecting the supply port of the control valve 46 to the outlet port of the pump, the hydraulic by-pass of the present invention maintains the intake valve in the open position using the existing pressure within the system. The pump 10 can continue to operate without expending work to overcome the by-pass valve. The pump of the present invention thus provides a more energy efficient fuel system than systems found in engines of the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A pump that pumps a fluid, comprising:
   a housing which has an inlet port, an outlet port and a pumping chamber;
   a piston that is located within said pumping chamber and which pumps the fluid from said inlet port to said outlet port;
   an intake valve that controls a flow of the fluid from said inlet port to said pumping chamber, wherein said intake valve provides fluid communication between said pumping chamber and said inlet port when in an open position; and,
   a solenoid control valve which controls and provides fluid to said intake valve to move and maintain said intake valve in the open position.

2. The pump as recited in claim 1, wherein said solenoid control valve contains a first solenoid and a second solenoid which move a spool between a first position and a second position, wherein said solenoid control valve allows the fluid to flow into said intake valve and move said intake valve into the open position when said spool is in the second position.

3. The pump as recited in claim 2, wherein said spool is digitally latched into the first and second positions.

4. The pump as recited in claim 1, further comprising a spring that biases said intake valve into a closed position.

5. The pump as recited in claim 2, wherein said solenoid control valve has a return port that is coupled to a cylinder port when said spool is in the first position and a supply port that is coupled to said cylinder port when said spool is in the second position, said cylinder port being in fluid communication with said intake valve.

6. The pump as recited in claim 5, wherein said return port of said solenoid control valve is coupled to said inlet port of said housing and said supply port of said solenoid control valve is coupled to said outlet port of said housing.

7. The pump as recited in claim 1, further comprising a wobble plate that reciprocates said piston and pumps the fluid out of said pumping chamber.

8. The pump as recited in claim 1, further comprising an elliptical cam that reciprocates said piston and pumps the fluid out of said pumping chamber.

9. The pump as recited in claim 1, further comprising a controller that actuates said solenoid control valve.

10. A fuel system for an internal combustion engine which has an internal combustion chamber, comprising:
   a fuel tank that contains a fuel;
   a pump that includes;
      a housing which has an inlet port that is coupled to said fuel tank, an outlet port that is coupled to the internal combustion chamber, and a pumping chamber;
      a piston that is located within said pumping chamber and which pumps the fuel from said inlet port to said outlet port;
      an intake valve that controls a flow of the fuel from said inlet port to said pumping chamber, wherein said intake valve provides fluid communication between said pumping chamber and said inlet port when in an open position; and,
      a solenoid control valve which controls and provides fuel to said intake valve to move and maintain said intake valve to the open position.

11. The fuel system as recited in claim 10, wherein said solenoid control valve contains a first solenoid and a second solenoid which move a spool between a first position and a second position, wherein said solenoid control valve allows the fuel to flow into said intake valve and move said intake valve into the open position when said spool is in the second position.

12. The fuel system as recited in claim 11, wherein said spool is digitally latched into the first and second positions.

13. The fuel system as recited in claim 10, further comprising a spring that biases said intake valve into a closed position.

14. The fuel system as recited in claim 11, wherein said solenoid control valve has a return port that is coupled to a cylinder port when said spool is in the first position and a supply port that is coupled to said cylinder port when said spool is in the second position, said cylinder port being in fluid communication with said intake valve.

15. The fuel system as recited in claim 14, wherein said return port of said solenoid control valve is coupled to said inlet port of said housing and said supply port of said solenoid control valve is coupled to said outlet port of said housing.

16. The fuel system as recited in claim 10, further comprising a wobble plate that reciprocates said piston and pumps the fluid out of said pumping chamber.

17. The fuel system as recited in claim 10, further comprising an elliptical cam that reciprocates said piston and pumps the fluid out of said pumping chamber.

18. The fuel system as recited in claim 10, further comprising a controller that actuates said solenoid control valve.

* * * * *